United States Patent [19]

Ahlers et al.

[11] Patent Number: 6,085,203
[45] Date of Patent: Jul. 4, 2000

[54] METHOD FOR CONVERTING DATA FORMATS WHICH DIFFER FROM ONE ANOTHER

[75] Inventors: Claus Ahlers; Werner Heinrich; Juergen Peifer, all of Munich; Georg Diessl, Sauerlach; Gerhard Walter, Pfaffenhofen, all of Germany

[73] Assignee: Siemens Aktiengesellschaft, Munich, Germany

[21] Appl. No.: 08/717,504

[22] Filed: Sep. 20, 1996

[30]         Foreign Application Priority Data

Sep. 22, 1995 [DE] Germany .......................... 195 35 306

[51] Int. Cl.$^7$ ..................................................... G06F 17/00
[52] U.S. Cl. ............................................ 707/523; 709/246
[58] Field of Search ..................................... 707/523, 517, 707/101, 4, 102; 709/246; 395/705

[56]                    References Cited

U.S. PATENT DOCUMENTS

| 5,119,465 | 6/1992 | Jack et al. ................................. 395/500 |
| 5,261,077 | 11/1993 | Duval et al. ............................. 395/500 |
| 5,339,434 | 8/1994 | Rusis ................................... 395/200.76 |
| 5,355,491 | 10/1994 | Lawlor et al. ........................... 395/707 |
| 5,394,546 | 2/1995 | Hanatsuka ................................... 707/4 |
| 5,416,917 | 5/1995 | Adair et al. ................................ 707/10 |
| 5,430,873 | 7/1995 | Abe et al. ................................ 395/702 |
| 5,550,978 | 8/1996 | Takahashi et al. ................. 395/200.66 |
| 5,566,332 | 10/1996 | Adair et al. ............................. 707/101 |
| 5,655,147 | 8/1997 | Stuber et al. ............................ 395/827 |

OTHER PUBLICATIONS

D.V. James, "Multiplexed Buses: The Endian Wars Continue", IEEE Micro, vol. 10, No. 3, Jun. 1990, CA, U.S., pp. 9–21.

J. Gillig, "Endian–Neutral Software, Part 2", Dr. Dobb's Journal, vol. 19, No. 13, Nov. 1994, CA, U.S.

Clark et al., "CHILL Language Solutions for Mixed Data Formats", fourth CHILL Conference, München, 1986, p. 157–161.

Novak, G. S. "Conversion of units of measurement" from IEEE transactions on software engineering, 21(8), pp. 651–661, New York, USA, Aug. 1995.

Muchnick et al. "F–code and its implementation: a portable software platform for data patallelism" from Computer Journal 36(8), pp. 712–722, Oxford, GB. Jan. 1993.

Cooper, et al., US Pat. 5,626,804 the abstract and exemplary claim 1, Apr. 29, 1997.

*Primary Examiner*—James P. Trammell
*Assistant Examiner*—Cuong H. Nguyen
*Attorney, Agent, or Firm*—Hill & Simpson

[57]                    ABSTRACT

A method for converting data formats which differ from one another during exchange of messages or data between programs running on different processors of a communication system provides that a conversion procedure is generated per each data type during the translation event of the source programs and that the conversion procedure which controls the conversion of the data formats is called during the later running of the processes and programs immediately before a message exchange.

14 Claims, 5 Drawing Sheets

FIG 1a

| Byte | 0 | 1 | 2 | 3 |
|---|---|---|---|---|
| Bits | 7 6 5 4 3 2 1 0 | 7 6 5 4 3 2 1 0 | 7 6 5 4 3 2 1 0 | 7 6 5 4 3 2 1 0 |
| SIGNIFICANCE OF THE BITS | 31    24 | 23    16 | 15    8 | 7    0 |
| EXAMPLE 1 | 00000000 | 00000000 | 00000000 | 00000001 |

FIG 1b

| Byte | 0 | 1 | 2 | 3 |
|---|---|---|---|---|
| Bits | 7 6 5 4 3 2 1 0 | 7 6 5 4 3 2 1 0 | 7 6 5 4 3 2 1 0 | 7 6 5 4 3 2 1 0 |
| SIGNIFICANCE OF THE BITS | 7    0 | 15    8 | 23    16 | 31    24 |
| EXAMPLE 1 | 00000001 | 00000000 | 00000000 | 00000000 |

FIG 5

```
// sample conversion procedure KON_LSBHI_2_LSBLO          // name of conversion procedure
//
// converts simple datatype LSB_LO with Litte Endian Format
// to simple datatype LSB_HI with Big Endian Format KON_LSBHI_2_LSBLO
    (
    LSB_HI          bigEndian           // datatype LSB_HI
                                        // received from program P
                                        // ( e.g. FIG 1a )
    )
    LSB_LO          litteEndian         // output datatype LSB_LO
                                        // required by program P
                                        // ( e.g FIG 1b )
BEGIN // conversion of datatype LSB_HI to datatype LSB_LO
litteEndian [ byte 0 ] = bigEndian [ byte 3 ];
litteEndian [ byte 1 ] = bigEndian [ byte 2 ];
litteEndian [ byte 2 ] = bigEndian [ byte 1 ];
litteEndian [ byte 3 ] = bigEndian [ byte 0 ];

return litteEndian;                 // datatype LSB_LO
                                        // returned to program P
END
```

METHOD FOR CONVERTING DATA FORMATS WHICH DIFFER FROM ONE ANOTHER

BACKGROUND OF THE INVENTION

1. Field of the Invention

The present invention relates generally to a method for converting different data formats, such as data formats used in programs that are convertible into executable object code as the result of a translation, or compiling operation performed by a translation, or compiling, program, wherein the different data types are converted from one format to another format.

2. Description of the Related Art

Contemporary communication systems often use multiple processors. A plurality of processors implement the control of internal system events in such multi-processors systems. Typically, such communication systems are heterogenous systems, which means that processors from various manufacturers are utilized in the communication system. However, these processors work according to manufacturer-specific standards. For example, data from individual processors are deposited in the respectively allocated memory in different formats. As long as programs that are usually allocated in one processor during their execution read data from the corresponding memory, process that data and write the data back into the corresponding memory, there is no limitations imposed on the operation of the system since the same data format is always used. Problems arise, however, when messages or data are exchanged between processors or the programs running on them, since the data must possibly be matched to the different data formats.

For example, data processed on processors of the Motorola family are stored by these processors in an LSB_HI format (least significant byte at the highest address), also referred to as Big Endian Format. By contrast, data that are processed on the processors of the Intel family are stored by these processors in an LSB_LO format (least significant byte at the lowest address), also referred to as Little Endian Format. In the case of data exchange between these two processor types, the data must be converted in an appropriate way.

To solve the problems of different data formats in process communications in heterogeneous systems, a specific transfer format has been defined for the exchange of messages and data. This means that the processor specific format is converted to a defined transmission format that is used only for the purpose of exchanging messages between processors before each message is exchanged. When the message has arrived at the destination processor, the data in the transmission format is reconverted into the processor specific format which is used at the receiving end. To accomplish this, a library containing the conversion functions for the basic data types of the respective programming languages is provided, according to the prior art. The transmission formats for the exchange of messages between processors can be determined with the assistance of these format conversions in the library.

In various programming languages, such as the programming language CHILL, the data formats of the data which is being stored can be defined by the developer of the application software. These conditions are disclosed in the publication "Language Solution for Mixed Data Formats", by Mark Clark and G. Walter, Fourth CHILL Conference, Munich, Sep. 29 through Oct. 2, 1986. The problems with such a procedure is that the programs which communicate with one another by exchanging messages are themselves responsible for the conversion of the exchanged messages between the processor specific data format and the transfer format. However, all required format conversions must be explicitly programmed into the coding of the each program by the developer of that application software. In particular, conversions of complex data types, such as structures and arrays, must be explicitly imaged into the conversions of the basic data types assisted by the library functions. This necessarily involves an increase in developmental for the program outlay as well as providing an additional source of error. Given a strict application of this technique, problems exist in that the conversion from the processor specific data format of the source processor and another conversion from the transfer format into the processor specific data format for the destination processor also are required even when sending messages between the programs that run on processors which have the same data format. This has a negative affect on the system dynamics, to say the least.

SUMMARY OF THE INVENTION

An object of the present invention is to provide a way that data formats can be converted for the exchange of messages or data between processors wherein the conversion between different data formats which is used is performed without a loss of dynamics to the system and with a reduced susceptibility to error.

An advantage of the present invention is that the procedures which are required for the conversion of the data between the different formats is already automatically provided during the translation, or compiling, procedure of the source programs. This is achieved by the translation, or compiler, program generating conversion procedures during the translation run which are based on the criterion of the data types used in the source programs, these conversion procedures being called during the later running of the translated programs before the exchange of messages. An advantage is provided in that the developer no longer has to undertake any explicit precautions for the conversion of the data in the application software. Not only is the developmental outlay for the software reduced, but an additional source of error is also eliminated. A further development of the present invention is that the conversion procedure is generated as source code which is converted into executable object code in a separate translation run.

Another advantage is provided wherein only the conversion procedure is generated given a repeated occurrence of the same data type for the data in a program to be converted. This saves time in the translation of the source program and saves memory space as well.

Another advantage of the present invention is that no conversion procedure need be performed in the case of the data exchange between processors which use the same data format. This inhibition in the conversion procedure is compelled by explicitly marking the corresponding data types in the source program with the suitable data format. The dynamics of the system are enhanced by the elimination of this unnecessary conversion.

BRIEF DESCRIPTION OF THE DRAWINGS

An exemplary embodiment of the invention is disclosed herein below with reference to the drawings wherein:

FIG. 1a and 1b are tables showing the different data formats used in a communication system with reference to a basic data type INTEGER;

FIG. 5 is a sample conversion procedure.

DETAILED DESCRIPTION OF THE PREFERRED EMBODIMENTS

Figure 2:
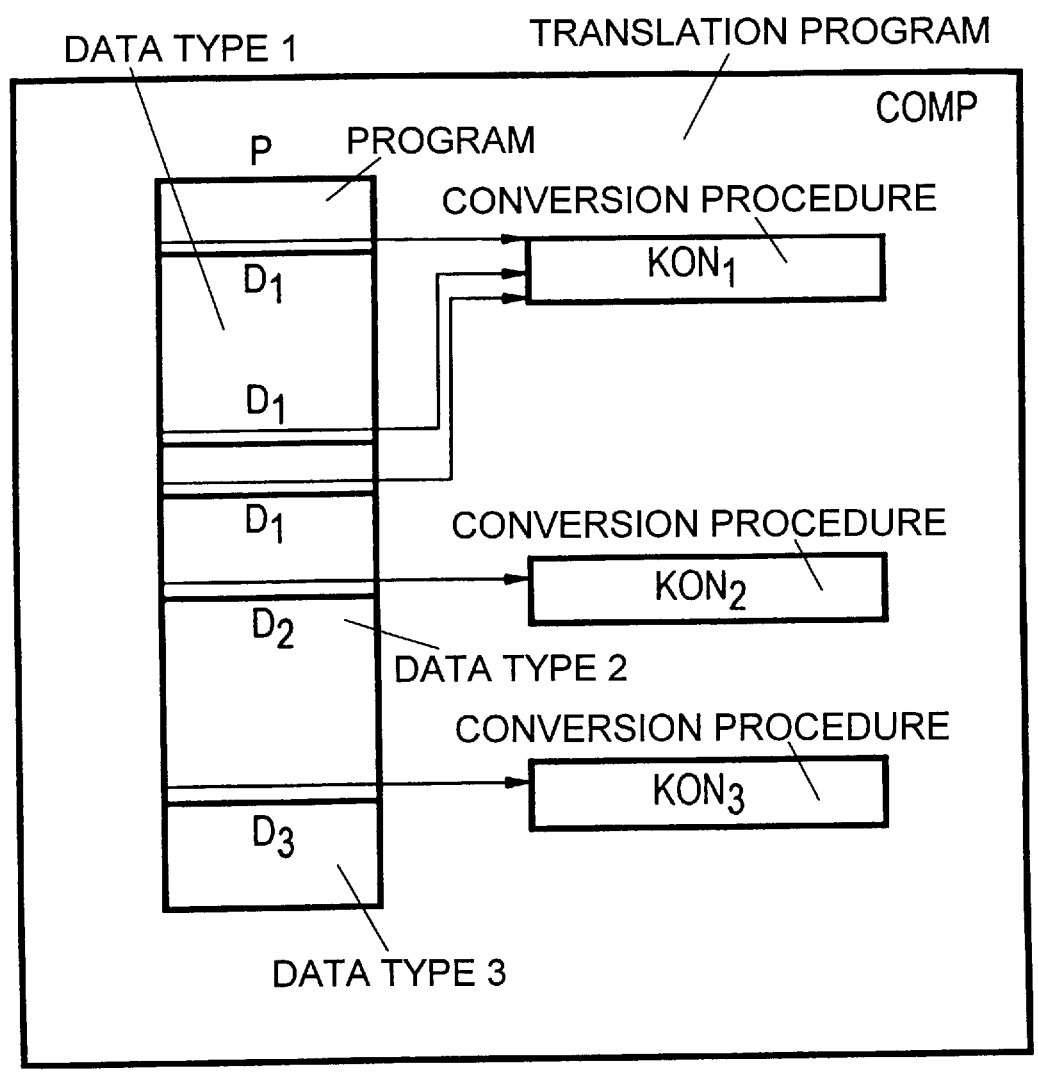
FIG. 2 is a schematic block diagram illustrating the method according to the present invention.

FIG. 1a and 1b show different data formats which are used by processors of a communication system when storing the data. The Big Endian Format as described above is shown in FIG. 1a. By way of example, four bytes are shown here, namely the byte 0, byte 1, byte 2, and byte 3. Each byte comprises eight bits. The significance of the bits is defined in ascending sequence beginning with bit 0 of byte 3 up to bit 7 of byte 0. The example illustrates how the decimal numeral 1 is presented in this data format. As is apparent, the least significant bit is set, which is bit 0 of the byte 3.

FIG. 1b illustrates the Little Endian Format as described above. Here, the significance of the bits is defined in the sequence as illustrated in the Figure. For example, the decimal numeral 1 is defined wherein the least significant bit is set as bit 0 of byte 0. By comparing the FIG. 1a and 1b, the two data formats which represent the same decimal numeral 1 can be seen as being defined in different ways such that it is apparent it is necessary to adapt the two data formats to one another during a data exchange.

Figure 3:
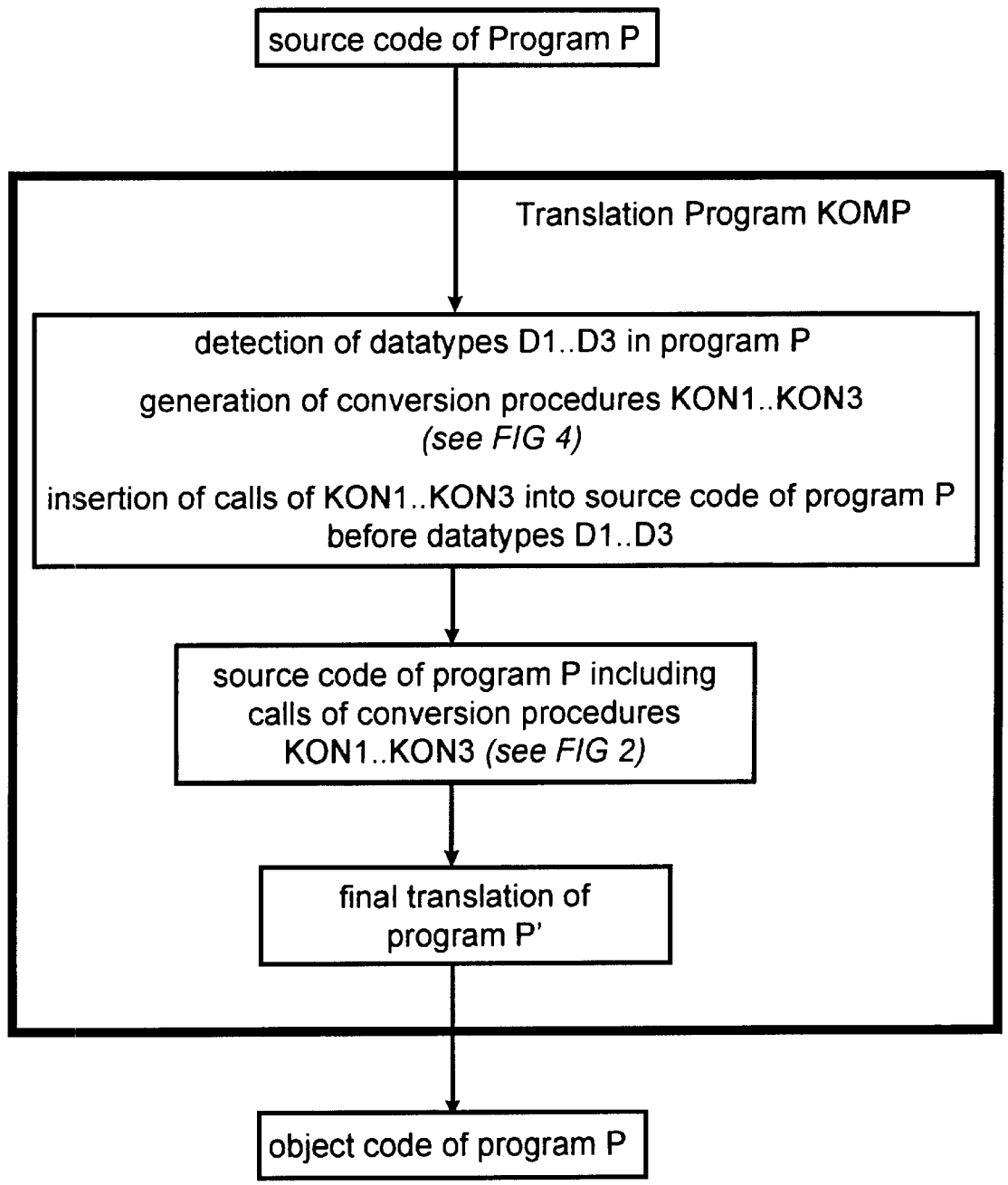
FIG. 3 is a block diagram of the compiling process according to the invention.

Referring now to FIG. 2, the method according to the present invention is illustrated in block diagram. It is assumed that the conversion events are automatically controlled by a translation, or compiler, program COMP during a translation, procedure, as also shown in FIG. 3. The programmer need not be concerned during the coding phase of the program as to how and in what way the conversion of the data formats should ensue. It is also assumed for this example that a program P to be translated comprises different data types. By way of example, the data types are identified here as $D_1$, $D_2$ and $D_3$. More complex data types such as structures or arrays that must be converted are also applicable for the present method. It is also assumed that in the exemplary embodiment of the present invention one data type appears repeatedly in the program P, namely the data type $D_1$. During the translation procedure, the places in the code of the program P in which messages to other programs are managed during the later execution are specifically handled under the control of the translation program COMP. The data type of the message is determined and a conversion procedure which is adequate to convert this data type into a data type of the destination process is subsequently generated as shown in FIG. 3. According to FIG. 2, this conversion procedure $KON_1$ is provided for the data type $D_1$. The procedure itself is deposited in the source code under a defined procedure name. Subsequently, the call for this conversion procedure is entered before the command that accomplishes the message exchange. However, the data type $D_1$ occurs two more times. No renewed generation of the conversion procedure $KON_1$ is undertaken at the renewed appearance of this data type as a message. Instead, the procedure call is merely inserted into the appertaining locations in the program.

Referring again to FIG. 2, the data types $D_2$ and $D_3$ subsequently appear as messages to other programs. Thus, further conversion procedures which differ from the conversion procedure $KON_1$ must be generated. In the illustrated embodiment, these are the conversion procedures $KON_2$ and $KON_3$. The conversion procedure is thus defined by the data type. In the present example, the conversion procedure $KON_2$ is allocated to the data type $D_2$ and the conversion procedure $KON_3$ is allocated to the data type $D_3$.

During the later running of the program after conversion into the object code, calls of the corresponding conversion procedures are made immediately before the message exchange. The data to be transmitted is thus converted directly into the respective data types for the destination processor. As a further development of the invention, the translation program COMP does not generate a conversion procedure for messages which are exchanged between processors that use the same data format.

The exemplary embodiment described above describes the message exchange between processors having different procedures for storing data. The invention, however, is not limited to this exemplary embodiment.

Figure 4:
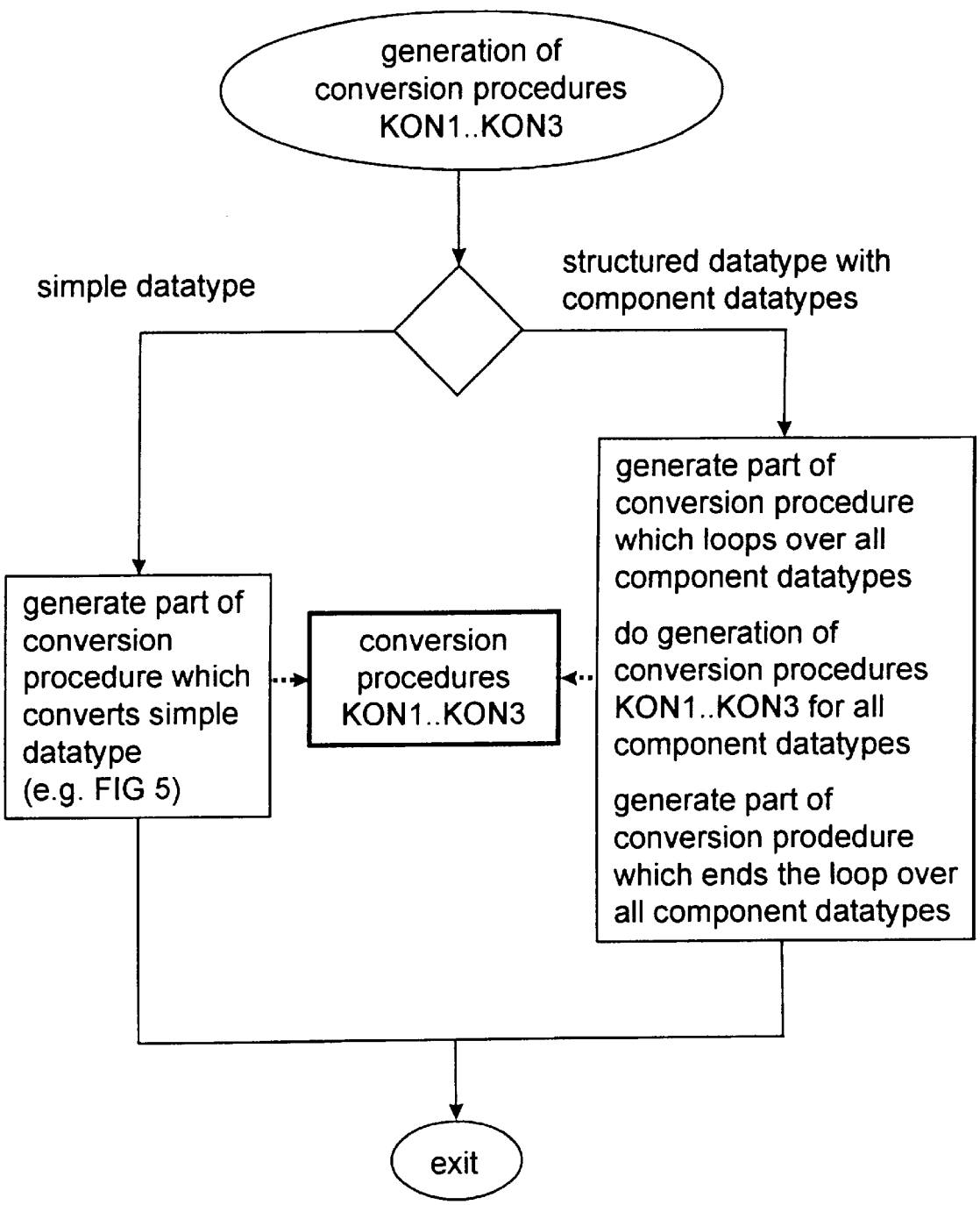
FIG. 4 is a flow chart of a conversion of simple and complex data types.

FIG. 4 illustrates and example of the present method applied to the conversion of simple and complex data types. After a determination of the data type, i.e. simple or complex, applicable conversion procedures are generated.

FIG. 5 illustrates a conversion procedure for Little Endian format to Big Endian format as a sample that is generated according to the present invention.

It is provided as a further development of the invention that different data formats can generally be employed in a program. Some programming languages such as, for example, the programming language CHILL allows the explicit specification of a data format by the programmer. This format is compelled by the programmer and differs from the processor specific formats described above. During the translation event, the conversion procedures are generated and called in the way as described in conjunction with FIG. 2.

The exchange of messages or data between programs running on different processors of communication system is thus described wherein the problem of different data formats used in different circumstances is solved. The method provides that the conversion procedure per data type is generated during the translation event of the source program, this conversion procedure controlling the conversion of the data formats during the later running of the processes and programs immediately before the message exchange.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for converting different data formats, comprising the steps of:

providing a program that potentially processes data of mutually different data types resulting from a transfer event;

compiling said program into executable object code using a compiler program;

during said compiling step, determining a data type of potentially processed data requiring conversion to a different data type of a destination;

generating a conversion procedure for converting said data type to said different data type during said compiling step;

calling said conversion procedure in said program prior to said transfer event during execution of said program; and converting said data type to said different data type of said destination using said conversion procedure.

2. A method for converting different data formats, comprising the steps of:
   providing a program that potentially processes data of mutually different data types resulting from a transfer event;
   compiling said program into executable object code using a compiler program;
   during said compiling step, determining a data type of potentially processed data requiring conversion to a different data type of a destination;
   generating a conversion procedure for converting said data type to said different data type during said compiling step;
   calling said conversion procedure in said program prior to said transfer event during execution of said program; and
   converting said data type to said different data type of said destination using said conversion procedure, wherein said step of generating a conversion procedure includes the steps of:
      generating the conversion procedure as source code; and
      compiling said conversion procedure from source code to executable object code in a compiling event separate from said step of compiling said program.

3. A method for converting different data formats, comprising the steps of:
   providing a program that potentially processes data of mutually different data types resulting from a transfer event;
   compiling said program into executable object code using a compiler program;
   during said compiling step, determining a data type of potentially processed data requiring conversion to a different data type of a destination;
   generating a conversion procedure for converting said data type to said different data type during said compiling step;
   calling said conversion procedure in said program prior to said transfer event during execution of said program; and
   converting said data type to said different data type of said destination using said conversion procedure, wherein said calling a conversion procedure step calls a same conversion procedure for each occurrence of a same data type to be converted in said program.

4. A method for converting different data formats, comprising the steps of:
   providing a program that potentially processes data of mutually different data types resulting from a transfer event;
   compiling said program into executable object code using a compiler program;
   during said compiling step, determining a data type of potentially processed data requiring conversion to a different data type of a destination;
   generating a conversion procedure for converting said data type to said different data type during said compiling step;
   calling said conversion procedure in said program prior to said transfer event during execution of said program; and
   converting said data type to said different data type of said destination using said conversion procedure; transferring data without calling said conversion procedure when said determining a data type of potentially processed data step determines said transfer event is to occur with a same data type.

5. A method of converting data between different data formats, comprising the steps of:
   providing a program which includes a step transferring data between a processor using a first data type and a destination processor using a second data type of a multi-processor system;
   identifying data types of the data to be transferred in the transferring step and data types of the destination processor;
   generating a conversion procedure to convert the data from the first data type to the second data type; and
   inserting a call to said conversion procedure into said program prior to the transferring step.

6. A method of converting data between different data formats, comprising the steps of:
   providing a program which includes a step transferring data between a processor using a first data type and a destination processor using a second data type of a multi-processor system;
   identifying data types of the data to be transferred in the transferring step and data types of the destination processor;
   generating a conversion procedure to convert the data from the first data type to the second data type; and
   inserting a call to said conversion procedure into said program prior to the transferring step, wherein said provided program includes a plurality of steps transferring data, wherein said step of generating said conversion procedure is performed once for converting the data from the first data type to the second data type, and wherein said step of inserting inserts a call to said conversion procedure prior to each of said steps of transferring data.

7. A method of converting data between different data formats, comprising the steps of:
   providing a program which includes a step transferring data between a processor using a first data type and a destination processor using a second data type of a multi-processor system;
   identifying data types of the data to be transferred in the transferring step and data types of the destination processor;
   generating a conversion procedure to convert the data from the first data type to the second data type; and
   inserting a call to said conversion procedure into said program prior to the transferring step wherein said first data type is least significant byte high and said second data type is least significant byte low.

8. A method of converting data between different data formats, comprising the steps of:
   providing a program which includes a step transferring data between a processor using a first data type and a destination processor using a second data type of a multi-processor system;
   identifying data types of the data to be transferred in the transferring step and data types of the destination processor;
   generating a conversion procedure to convert the data from the first data type to the second data type; and
   inserting a call to said conversion procedure into said program prior to the transferring step, wherein said first data type is least significant byte low and said second data type is least significant byte high.

9. A method of converting data between different data formats, comprising the steps of:
 providing a program which includes a step transferring data between a processor using a first data type and a destination processor using a second data type of a multi-processor system;
 identifying data types of the data to be transferred in the transferring step and data types of the destination processor;
 generating a conversion procedure to convert the data from the first data type to the second data type; and
 inserting a call to said conversion procedure into said program prior to the transferring step, wherein said step of generating includes the steps of:
  generating said conversion procedure in source code, and
  translating said conversion procedure from the source code to executable object code.

10. A method as claimed in claim 9, wherein said step of providing said program includes the steps of:
 providing said program in source code, and
 translating said program from source code to executable object code.

11. A method as claimed in claim 10, wherein said step of translating said program is performed separately from said step of translating said conversion procedure.

12. A method for converting between different data formats, comprising the steps of:
 providing a first program having at least one data transfer step to transfer data to a second program using a destination data format different than a data format used by said first program;
 identifying the data format of the first program and the destination data format used by said second program;
 generating a conversion procedure to convert data from the data format used by said first program to the destination data format used by said second program.

13. A method for converting between different data formats, comprising the steps of:
 providing a first program having at least one data transfer step to transfer data to a second program using a destination data format different than a data format used by said first program;
 identifying the data format of the first program and the destination data format used by said second program;
 generating a conversion procedure to convert data directly from the data format used by said first program to the destination data format used by said second program, wherein said first program includes at least one transfer step to transfer data to a third program using a data format different from the data format used by said first program and different than the data type used by said second program, and further comprising the steps of:
  generating a further conversion procedure to convert data from the data format used by said first program to the data format used by the third program;
  inserting a call into said first program to said further conversion procedure before each of said at least one transfer step to transfer data to said third program.

14. A method for converting between different data formats, comprising the steps of:
 providing a first program having at least one data transfer step to transfer data to a second program using a destination data format different than a data format used by said first program;
 identifying the data format of the first program and the destination data format used by said second program;
 generating a conversion procedure to convert data directly from the data format used by said first program to the destination data format used by said second program;
 translating said conversion procedure and said further conversion procedure to an executable form separately from conversion of said program to an executable form.

* * * * *